US008131694B2

(12) United States Patent
Bender et al.

(10) Patent No.: US 8,131,694 B2
(45) Date of Patent: Mar. 6, 2012

(54) PROCESS-ORIENTED CLASSIFICATION

(75) Inventors: Harald Bender, Bensheim (DE); Daniel Buchmann, Pfinztal (DE); Uwe Pyka, Sinsheim-Hilsbach (DE); Michael Zoeller, Rauenberg (DE)

(73) Assignee: SAP AG, Walldorf (DE)

( * ) Notice: Subject to any disclaimer, the term of this patent is extended or adjusted under 35 U.S.C. 154(b) by 1353 days.

(21) Appl. No.: 10/987,273

(22) Filed: Nov. 12, 2004

(65) Prior Publication Data

US 2006/0106820 A1    May 18, 2006

(51) Int. Cl.
*G06F 7/00*    (2006.01)
*G06F 17/30*    (2006.01)
(52) U.S. Cl. ........................................ 707/705; 717/120
(58) Field of Classification Search .................. 707/100, 707/101, 705; 717/120
See application file for complete search history.

(56) References Cited

U.S. PATENT DOCUMENTS

| | | | |
|---|---|---|---|
| 5,946,696 A * | 8/1999 | Young ........................ 707/104.1 |
| 6,105,132 A * | 8/2000 | Fritch et al. .................... 713/167 |
| 6,289,458 B1 * | 9/2001 | Garg et al. ....................... 726/21 |
| 6,336,211 B1 * | 1/2002 | Soe ................. 717/108 |
| 6,701,313 B1 | 3/2004 | Smith |
| 7,257,568 B2 * | 8/2007 | Kimbrough et al. ............... 707/3 |
| 2003/0046244 A1 | 3/2003 | Shear et al. |
| 2003/0093421 A1 * | 5/2003 | Kimbrough et al. ............... 707/3 |
| 2004/0103042 A1 | 5/2004 | Ryu et al. |
| 2004/0111416 A1 * | 6/2004 | Kingham et al. ................ 707/10 |
| 2004/0193506 A1 | 9/2004 | Zmolek |
| 2005/0289504 A1 * | 12/2005 | Buchmann et al. ........... 717/102 |
| 2006/0083423 A1 * | 4/2006 | Brown et al. .................. 382/159 |
| 2007/0016601 A1 * | 1/2007 | Cameron et al. .............. 707/101 |
| 2008/0021921 A1 * | 1/2008 | Horn ............................. 707/102 |

FOREIGN PATENT DOCUMENTS

WO    WO 03/042865    5/2003

OTHER PUBLICATIONS

Cologne Institute for Business Research Consult Ltd., "eCl@ass: A Standardized Material and Service Classification System," Jul. 2001, [online], [retrieved from the Internet: http://www.eclass-online.com/], 34 pgs, XP002320838.
Kim, Dongkyu, et al., "A Semantic Classification Model for e-Catalogs," *Proceedings of the IEEE International Conference on E-Commerce Technology*, San Diego, CA, USA, Jul. 6-9, 2004, pp. 85-92.
Leukel, Joerg, et al., "A Modeling Approach for Product Classification Systems," *Proceedings of the 13th International Workshop on Database and Expert Systems Applications*, Aix-en-Provence, France, Sep. 2002, pp. 868-874.
Mar. 2002, [online], [retrieved from the Internet Mar. 24, 2004: http://wwws.sun.com/software/sunone/wp-spine/spine.pdf], pp. 1-32, XP002274909.

* cited by examiner

*Primary Examiner* — Apu Mofiz
*Assistant Examiner* — Jared Bibbee
(74) *Attorney, Agent, or Firm* — Schwegman, Lundberg & Woessner, P.A.

(57) ABSTRACT

The present invention relates in general to a data object model for describing objects within systems. To allow unambiguous classification, the data model comprises a property definition including at least one property name, at least one property value and at least one process value for storing at least one process identifier identifying processes assigned to the property.

12 Claims, 8 Drawing Sheets

PROCESS-ORIENTED CLASSIFICATION

FIELD OF THE INVENTION

This description relates to process-oriented classification.

BACKGROUND

In computer systems, and in particular in data management systems that provide management of real world objects, such as items, products, facilities, materials, machines, and others, the real world objects can be processed electronically using business objects. The business objects can represent the real world objects using data structures. The structures can comprise classes that carry properties. Classes can be used to organize real world objects into certain categories. Within the business objects, relevant information of the real world objects may be stored within properties. Using the business objects and their properties allows simulating real world processes within computer systems. Further, production data, sales data, quality management data, purchasing data, and any other information available within a company can be represented within the data management system using the different business objects.

It may be necessary for processes or applications within the data management systems to classify the objects they use. Classification may be useful, for instance, in a catalogue, for batch determination, configuration, or the planning of a marketing campaign. In addition, classification can be helpful for production planning, quality management, sales management, computer-aided manufacturing, computer-aided design, and any other business tasks. When classifying objects, these objects can be allocated to certain classes. The properties of the classes can be valuated, which is the act of setting a value, for the particular object. The class can represent generic attributes of all objects within the class. For instance, capstan screws and slotted screws may be classified as screws. This generic information can be used for classifying all screws. Properties can represent certain attributes of objects, for instance, the color of an object.

Objects may need to be classified according to classification standards. For example, classification standards can allow communication between different business partners, e.g., different data management systems. Classification standards provide certain classes with certain properties to be used for classification of business objects. For instance, a classification standard, for example eCl@ss, can be used. To allow communication of classified objects between two systems, it may be necessary to agree bilaterally between two systems which classification standard to use. However, a general standard can prevent using properties and values required to describe the object sufficiently because these properties might not be available within the agreed standard.

In addition, it may be necessary that a certain object needs to be classified for different purposes. For instance, products and materials can be used within many different business processes. Each of these business processes can have different requirements concerning the classification of the objects it uses. For instance, for production it can be helpful to know the type of a screw, e.g., whether it is a capstan or a slotted screw. However, quality management systems might need different information about the screws, for instance, whether these are stainless or made from certain materials. Quality management thus requires different classification of the screws than production management.

Thus, a classification tool or engine can be required to support the use of an object's classification by several different processes. When different applications or processes share different object classifications, properties, classes, class hierarchies, and class networks may need to be shared across the different applications or processes. Class allocations and property valuations of the resulting object classification may also be required to be shared among the several different processes.

It may be necessary to allow controlling whether a certain application or process is allowed to change a certain allocation of an object to a class or a certain valuation of a property. In addition, the valuation of properties of objects is required to be unique, i.e., the color of a particular material needs to be consistent within all applications and processes. Otherwise, the properties of an object used by a first application might not correspond to an object's properties used in a second application or even with the real world object. On the other hand, different valuations for properties of a single object might lead to ambiguous communication of objects between different applications.

SUMMARY

As described below, an object model, method, and computer program products are provided for classifying objects independently of applications or processes that may request the classification. Classification may include identifying the requesting application or process, determining what properties are allowed for the identified process, and assigning the determined properties to the object. A classification engine, independent of the requesting applications or processes may perform the classification.

More specifically, for example, embodiments of the invention may integrate the handling of classes, class allocation, and valuation using the classification engine. This integration provides consistent valuation. Parallel use of various classification standards within one system is possible according to embodiments. Classification standards can be extended flexibly with further properties. The implementation enables communication of business objects between various systems without the use of a classification scheme.

Embodiments provide a data object model for describing objects within systems with a property definition including at least one property name, at least one property value and at least one process value for storing at least one process identifier identifying processes assigned to the property.

The data object model according to embodiments provides object classification independently of processes or classes. The properties themselves carry information; for example, the process for which it is used, or the process for which it is relevant. Properties are made available for processes, and may be assigned directly to an object. The properties can also be valuated directly from the process without the need of a class. One advantage of classifying objects using the properties is uniformity of description of the objects. All objects are described using the properties available from a pool of common properties. Inconsistencies due to classification within different classification schemes can be resolved. Within a classification engine, each process can assign a variety of properties to an object. When accessing an object, its properties relevant for the process can be provided directly, depending on the process value stored within the properties of an object.

Embodiments of the data object model provide a process access value for storing access rights to the property by at least one process. This process access value can be used to determine which process has access to a property. This can, for instance, be an owning process, which can have read and write access or a process that only has read access. The process value can be stored together with property values during valuation of an object. Thus, the process that valuated a certain object is known. Different processes can also access this particular property of the object; however, access can be restricted using the access value.

Other embodiments of the data object model provide a class definition storing assigned properties and omitting storing assigned processes. The class therefore does not carry any information about processes. The class can be used with these processes, which are assigned to the properties of the objects to which the class also refers.

Embodiments of the data object model use standardized property names and/or property values. Standardization of the properties allows using these within various processes to describe objects uniformly and beyond system borders. This can, for instance, be standardization according to ISO 13584-42. Standardized classification systems can share some of these standardized properties. An object can be classified according to different classification systems used within different applications or processes.

Another aspect of the invention is a computer-implemented method for providing objects with object classification, providing a classification engine assigning properties to objects by identifying a process using the object, determining properties allowed for the identified process, and classifying the object by assigning the identified properties directly to the object.

A classification engine may be provided, which allows managing the allocations of properties and/or classes to objects. The classification engine may also store information about which processes have assigned which properties or classes to which objects. Any process-independent classification may therefore be controlled within the classification engine. The classification engine may store a table with information about the processes and the corresponding objects. The classification engine may also be provided to implement the features as described further below.

By providing the inventive allocation of properties to objects, object valuation becomes unambiguous. The central classification engine may allocate properties to objects and valuate the properties unambiguously. By using classes and properties independently of processes, multiple classification standards may be used in parallel.

Embodiments provide a computer-implemented method that valuates the properties of the object directly using the property values defined for the respective property, independently of the process. Therefore, property values as defined in the data object model can be used by every process. The available values do not depend on the process classifying the object.

When classifying the object, i.e., assigning properties to the object and valuating the properties, the respective process carrying out this classification needs to be identified and stored in conjunction with this classification. Therefore, embodiments provide a computer-implemented method for providing within the classification engine a process access value for storing access rights of at least one process to a particular property and/or object classification. The process requesting classification can be the owning process with all access rights, including reading and writing rights. The owning process can also change or delete the classification of the object with the particular property. Other processes, however, can have read and/or write access rights. In addition, embodiments provide storing read and/or write access rights within the access value. Processes that are not the owning processes may only be granted read access to valuation and class allocation. The integrity of allocation and valuation in a multi-process scenario may thus be ensured.

This access management, for instance controlling access to properties of an object by different processes, is possible by storing at least one owning process identifier together with an assignment of a property to an object. For each property, at least one process can be assigned. When assigning properties to an object, an additional attribute providing information about the respective process that owns this valuation or class allocation can be stored. It can also be possible to store within this additional attribute information about several owners of the respective property or class. The setting and changing of this attribute can be subject to access restrictions. According to other embodiments, a computer-implemented method provides a process access to a property and/or an object classification based on the access rights of the process.

A computer-implemented method, according to embodiments, enables classifying an object with a class independently of a process. The class itself does not carry any information about a process. The class can be used by a process for classification if it contains properties that are relevant for the particular process. In addition, embodiments enable a class to be classified by processes for which identifiers are stored within the process values of the properties available within the respective class. As the class is process-independent it can be used with multiple processes (in contrast to former classification systems, where a class was implicitly or explicitly assigned to a single process).

To identify the process accessing a certain object, a process identifier may be received from a process accessing an object according to embodiments. For instance, a classification engine can be used for receiving the process identifier and obtaining the respective data from the accessed object.

Embodiments provide receiving within the classification engine a process identifier from a process accessing an object. This identifier can be used to determine properties relevant for the requesting process. Thus, the classification engine, which may be a piece of software, an integrated circuit or a circuit arrangement, can identify the requesting process and can obtain the respective values from the requested objects.

It also is possible to read an object's classification using the class allocated to the object. After determining the class allocated to the object, the relevant subset of the valuation according to the properties of the class may dynamically be determined. This can, for example, also be done by the classification engine.

To allow dynamic classification of an object to a class, implementations provide determining object properties and determining a class within available classes of a system that contains properties that most closely resemble the determined properties. In addition, a filter may be applied to the valuation of the object. Coexisting, different classification standards may also be supported. If an object is received within a system, the valuation of the object can be determined. Knowing the properties of this object, the classes, which are likely to fit most to the properties of the received object, can be determined. Comparing the properties of the object with the properties of the available classes in the system can allow determining the classes most closely resembling the received object. It can also be possible to determine from the automatic classification whether a received object is already available within the receiving system.

According to embodiments, object searches using properties, property values and object classes independently of a process are provided. Objects can be searched for using properties, property values, or classes. As the properties, property values and/or classes are independent of a process, a search engine can search for objects within various different systems or processes. The search engine as well as the user need not be concerned about a process-specific classification system. Searching for standardized properties, property values, or classes makes searches easier and more efficient.

Other aspects of the invention are a computer program, and a computer program product with object classification, the program comprising instructions operable to cause a processor to assign properties to objects by identifying a process using the object, determining properties allowed for the identified process, and classifying the object by assigning the identified properties directly to the object.

Referring now to the drawings, in which like numerals represent like elements throughout the figures, aspects of the present invention and the operating environment will be described.

DETAILED DESCRIPTION

In FIGS. 1-8, while reference numbers 100/200, 110/210 . . . denote similar elements, the function of these elements can be different.

Figure 1:
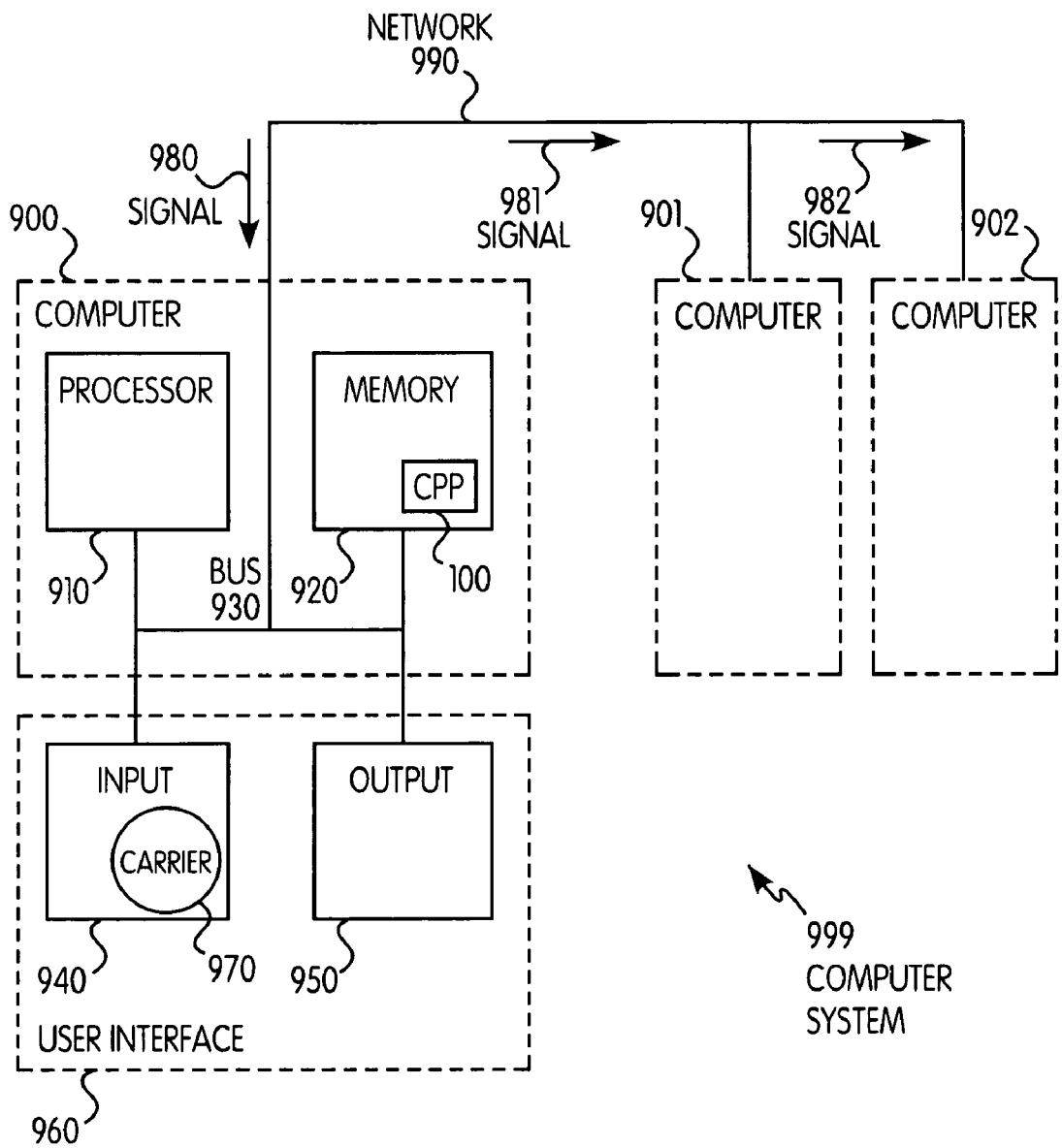
FIG. 1 is a block diagram of a computer system for providing object classification.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980. With respect to computer 900, computer 901/902 is sometimes referred to as "remote computer," computer 901/902 is, for example, a server, a peer device or other common network node, and typically has many or all of the elements described for computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is comprised of elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read-only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); or (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and, optionally, data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer-readable medium with computer-readable program code to cause the computer to perform methods of the present invention. Further, signal 980 can also include computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, cathode ray tube (CRT), flat panel display, liquid crystal display (LCD), speaker, printer, plotter, vibration alert device. Output device 950 can communicate with the user, but it can also communicate with other computers.

Input device 940 and output device 950 can be combined to a single device. Any device 940 and 950 can be provided optionally.

Bus 930 and network 990 provide logical and physical connections by conveying instruction and data signals. While connections inside computer 900 are conveniently referred to as "bus 930," connections between computers 900-902 are referred to as "network 990." Optionally, network 990 includes gateways, which are computers that specialize in data transmission and protocol conversion.

Devices 940 and 950 are coupled to computer 900 by bus 930 (as illustrated) or by network 990 (optionally). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., the world wide web (WWW)). Network 990 can be a wired or a wireless network. To name a few network implementations, network 990 can be, for example, a local area network (LAN), a wide area network (WAN), a public switched telephone network (PSTN); an Integrated Services Digital Network (ISDN), an infra-red (IR) link, a radio link, like Universal Mobile Telecommunications System (UMTS), Global System for Mobile Communication (GSM), Code Division Multiple Access (CDMA), or a satellite link.

A variety of transmission protocols, data formats and conventions is known, for example, transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

The terms "computer" and "program" are closely related. As used hereinafter, phrases, such as "the computer provides" and "the program provides," are convenient abbreviations to express actions by a computer that are controlled by a program.

Figure 2:
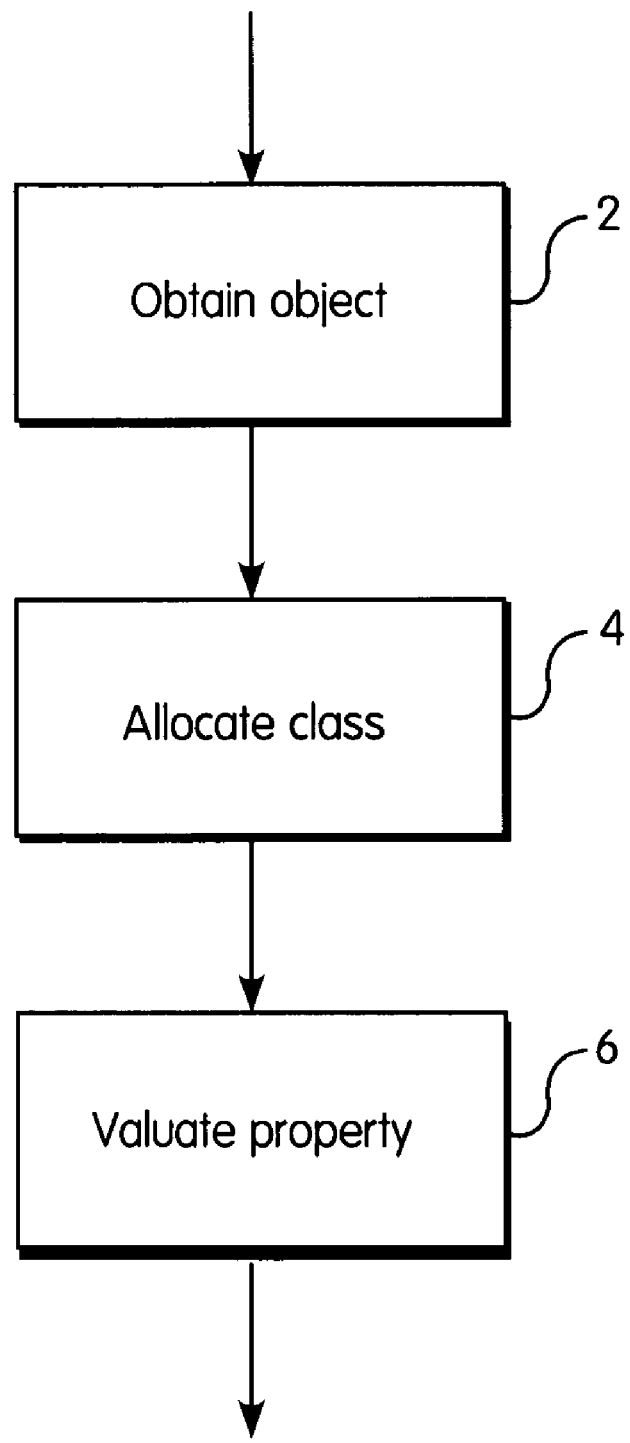
FIG. 2 is a flowchart of a previous object classification method.

FIG. 2 shows a flowchart for object classification according to prior art. A plurality of business-related software applications, processes, and other applications need to classify the objects they use. When classifying objects, the objects are read by the system (2). After reading the objects, a classification tool can allocate a class to the respective object as defined by the respective process or application (4). This allocation assigns the class to the object for the particular process. After allocating the class to the object (4), the properties of the object are valuated (6). Valuating properties may result in assigning certain values to the properties of the object.

The classification as shown in FIG. 2 depends on the classifying process. The allocated class is assigned to the process and the properties are part of the respective class. Automatic classification is not possible, since the relevant process for the classification cannot be determined from outside the system. The shown classification is process-dependent, each process having a variety of different classes. The classes within a process can differ between various processes. Communication between the processes using the classified objects can thus be inhibited or ambiguous, as the classes can be different within the processes, and valuations of objects may not be unique.

Figure 3:
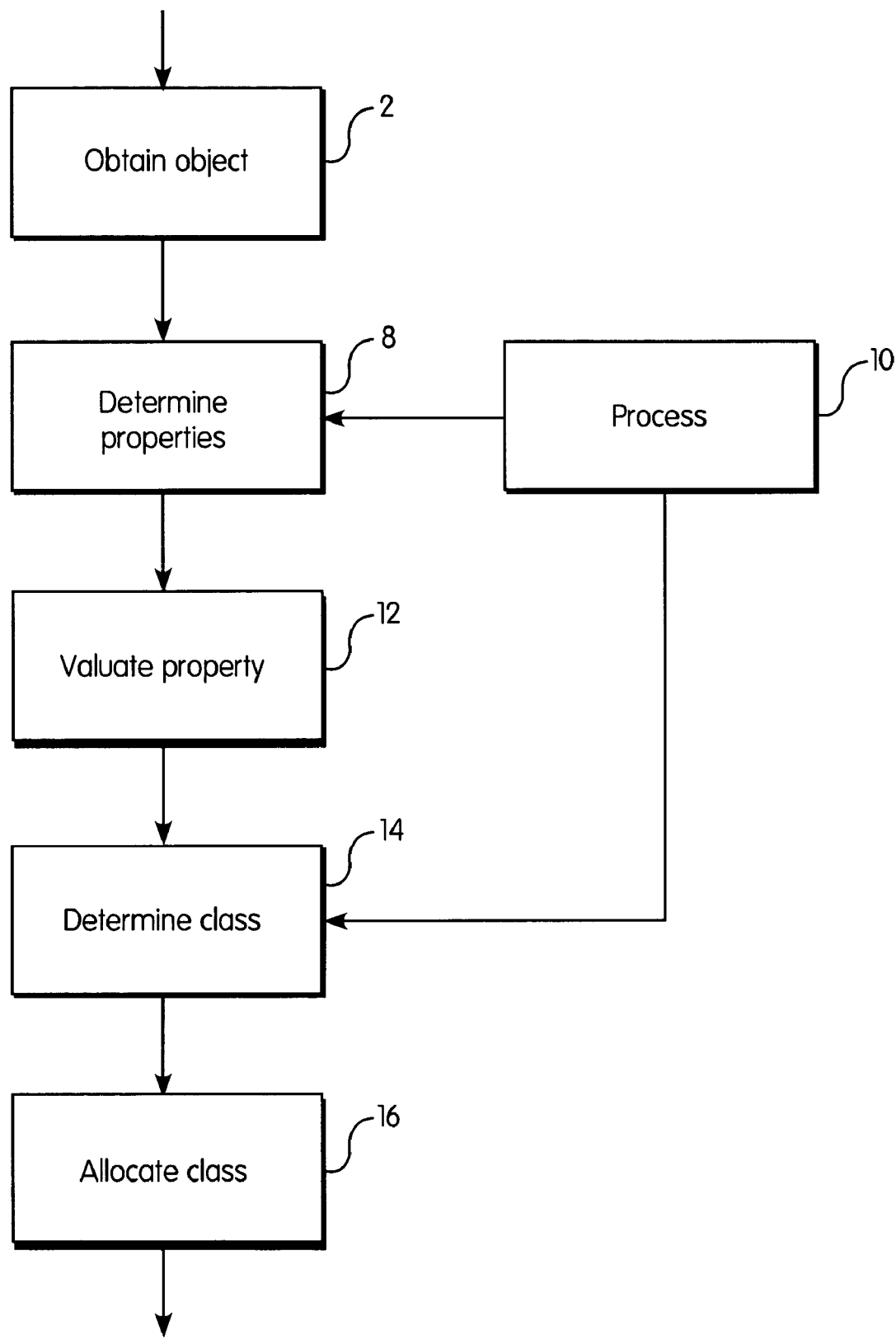
FIG. 3 is a flowchart of an implementation according to the inventive method.

FIG. 3 shows a flowchart according to embodiments. After having obtained an object for classification (2), a process (10) can define the properties of the respective objects. The properties, which already carry all valuation information, are determined (8). The determined properties are used for valuation (12). A classification engine may manage the classification for all processes. For each process, a variety of properties are available from a pool of properties. The properties themselves do not carry any information about the processes for which they are relevant. The classification engine can assign a property to an object for a particular process. This assignment can be stored in the classification engine. In addition, each process can use the desired classification information, independently of a classification system.

For instance, the engine may store information regarding which process has classified which object with which property. The determined properties are assigned to the object and valuated accordingly (12). Additionally, within the classification engine information can be stored regarding which process is responsible for which classification, e.g., which property is assigned to which object by which process. The properties can be assigned to the owning process.

For classification of the objects with a class, the class can be automatically used by a process if properties of the class are properties that have already been assigned to the objects by the respective process (14).

The determined class is allocated to the object (16). After having allocated the class to the object, the properties assigned to the class are added to the properties already available through object valuation. Additionally, the object may carry properties assigned through the process itself as well as properties assigned through the class. The assignment of properties to an object (8) and of a class to an object (14) may be done together with storing at least one owning process identifier, which will be further shown in FIG. 4.

Figure 4:
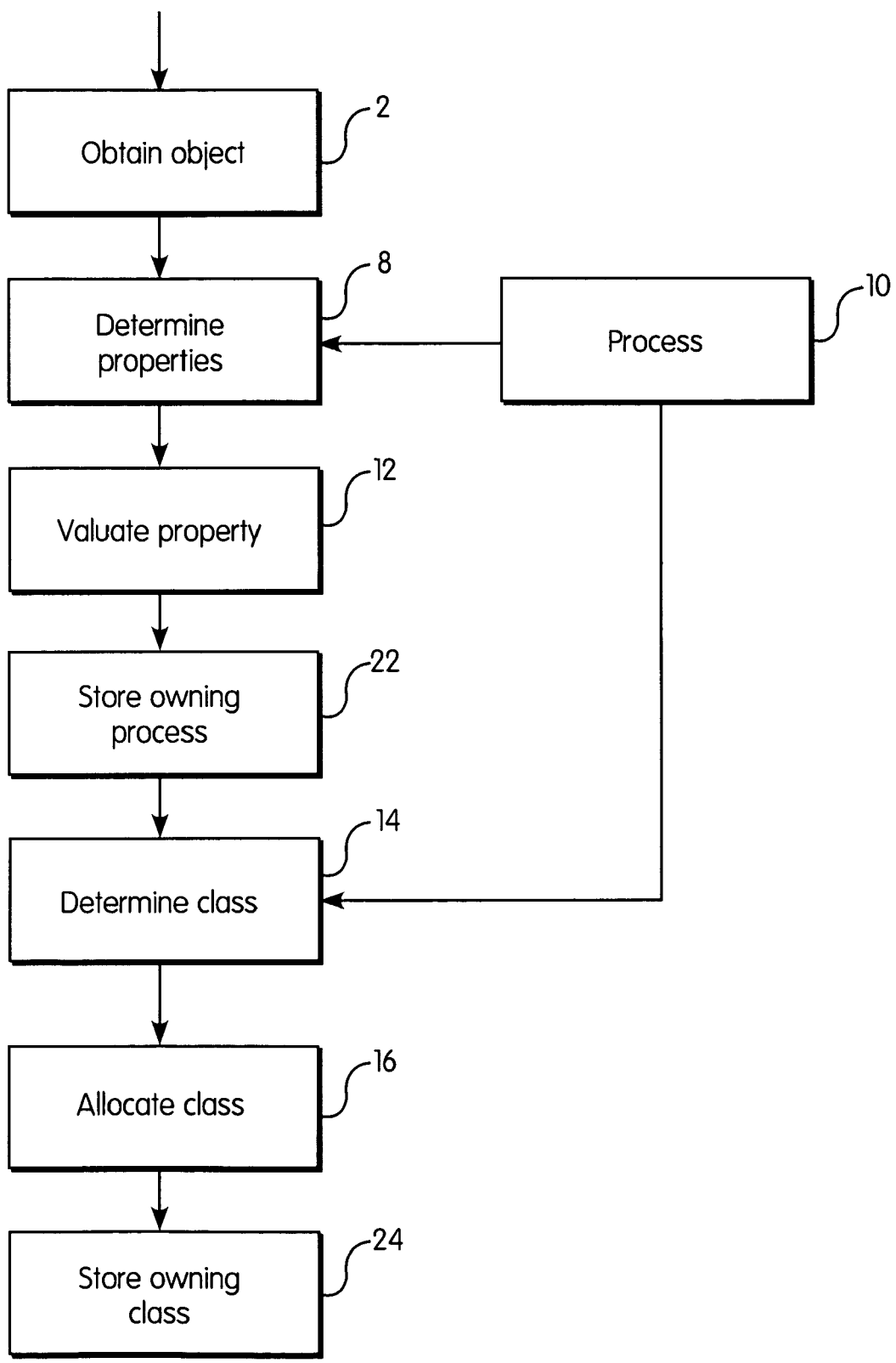
FIG. 4 is a flowchart of a further implementation according to the inventive method.

FIG. 4 shows a flowchart similar to the flowchart shown in FIG. 3. The figure shows storing an owning process (22) together with property valuation (12) of an object and storing an owning class (24) together with class allocation (16) of an object.

After having valuated the properties (12), the owning process of the properties can be stored (22). This can be done within an attribute indicating whether the respective process owns this valuation. Several owners of a valuation can be possible. The setting and changing of this attribute can be subject to access restrictions. Other processes than the owning ones can, for instance, be granted read-only access to the attribute.

The same may apply to a class allocation (16), wherein an attribute may be stored together with the class allocation indicating whether a respective process owns this class allocation. Changes to the class allocation may only be granted to the owning process. Thus, the integrity of valuations and allocations in a multi-process scenario may be ensured.

Figure 5:
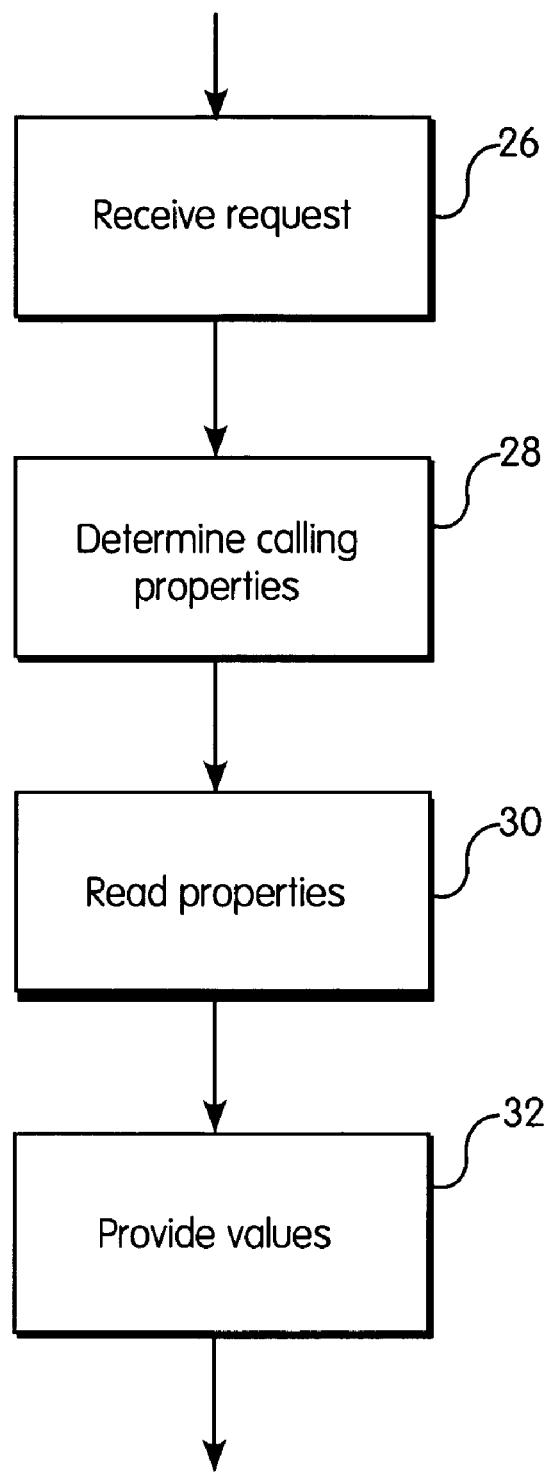
FIG. 5 is a flowchart of a method for determining object properties.

FIG. 5 shows a method for providing the permitted values for a process requesting classification of an object. The access to an object can be triggered by a process. A classification engine can receive from a calling process a process identifier identifying the process when reading a respective object (26). The received process identifier can be used for determining the calling process (28). Since not every process needs all information about properties assigned to an object, but only certain properties of it, the properties assigned to the calling process as identified may be read (30). According to the calling process, the relevant sub-set of object properties and its valuations can be determined and provided to the calling process (32).

Figure 6:
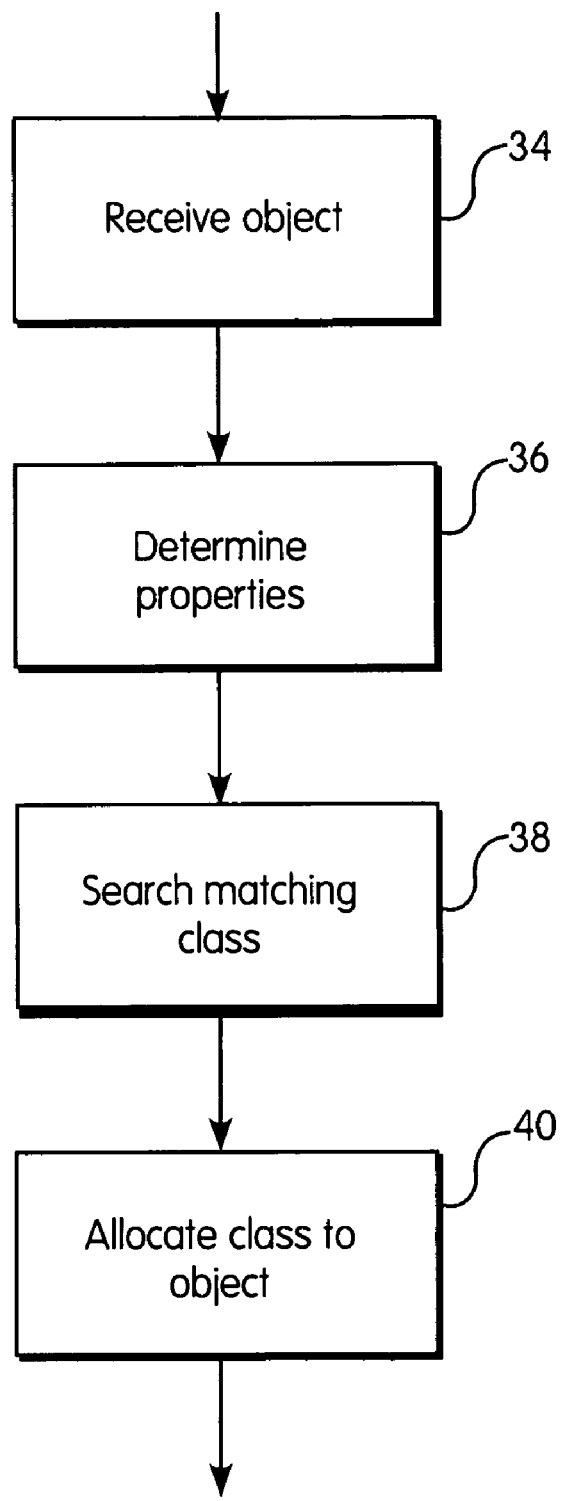
FIG. 6 is a flowchart of a method for dynamic object classification.

Objects can be used within different sub-systems. To allow using classification of objects in different systems, even with different classes assigned to the processes of the sub-systems, an implementation according to FIG. 6 is provided.

An object may be transferred from a first system into a second system. Within the second system, the object is received (34). The received object carries a valuation with properties. These properties may be determined (36). From the valuation of the object, it can be determined into which classes this object is likely to fit. This can be done by searching for the class whose properties most closely resemble the properties of the received object (38). After finding the respective class, this class may be allocated to the received object (40). The new classification may be used within the new system.

The implementations according to FIGS. 2-6 can also be carried out using a computer program in a computer program product (100) within a system depicted in FIG. 1.

Figure 7:
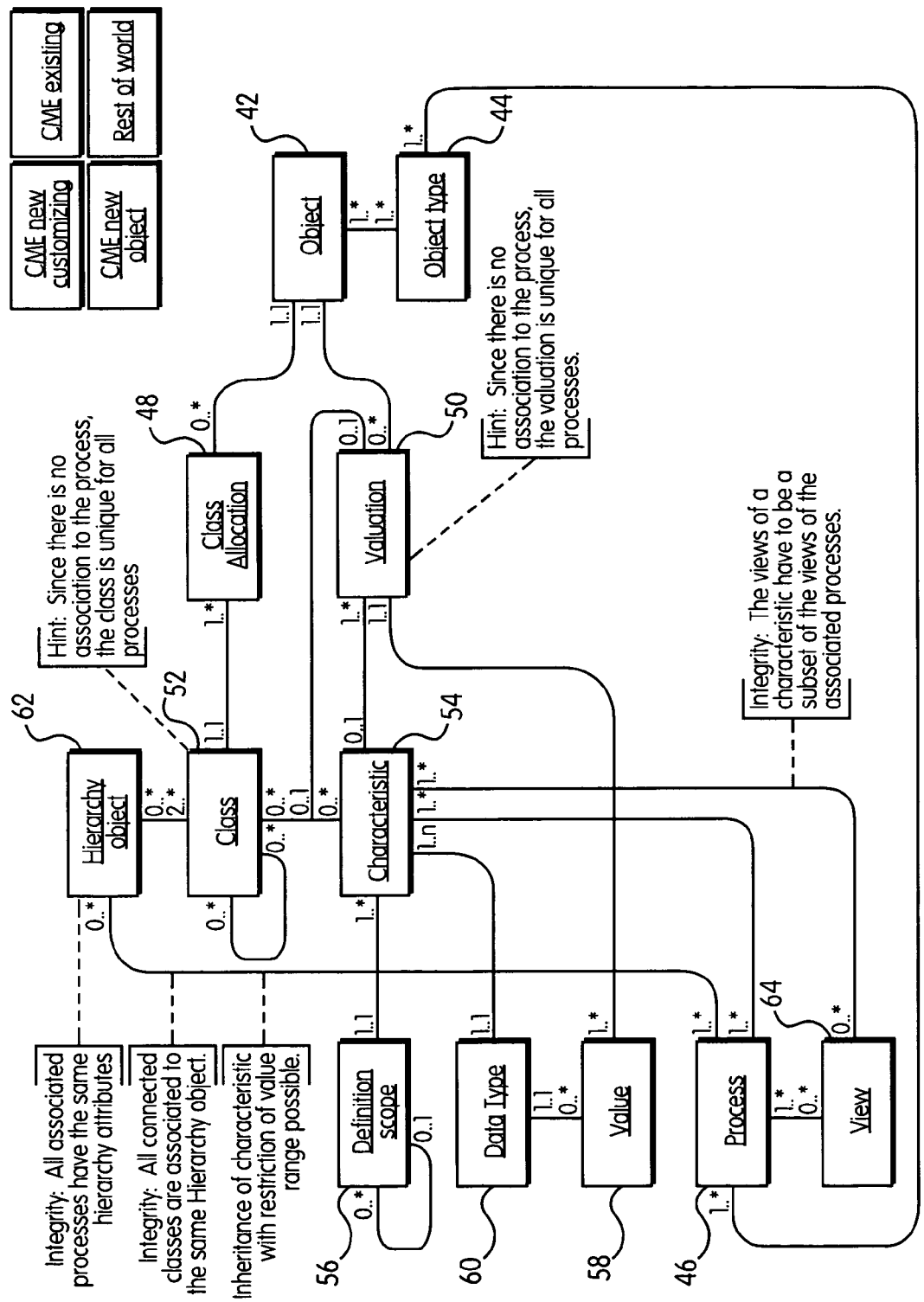
FIG. 7 is a UML diagram for implementing an object model for process-oriented classification.

FIG. 7 shows an UML diagram of an object definition according to embodiments. An object 42 may be of a particular object type 44. The object type may depend on the process 46 in which the object 42 is used.

For object classification, the object may be assigned to a class allocation 48 and property valuation 50. As can be seen from the diagram, the class allocation 48 and the property valuation are independent from the process 46.

Class allocation 48 may be done using different classes 52, each of which has certain characteristics 54. The characteristics obey a definition scope 56. Property valuation may be done using certain values 58, which are independent from the respective process 46. The values are of defined object types 60. Since there is no association between property valuation and process 46, valuation is unique for all processes. In addition, as there is no association between the classes and the processes, the class allocation can be unique, too.

Classes 52 are located within a class hierarchy 62. All associated processes 46 to a particular class hierarchy 62 have the same hierarchy attributes. All connected classes for a particular process 46 are associated with the same hierarchy object.

The views 64 of a characteristic are associated with the process 46. The views 64 of a characteristic have to be a subset of the views of the associated process 46.

Figure 8:
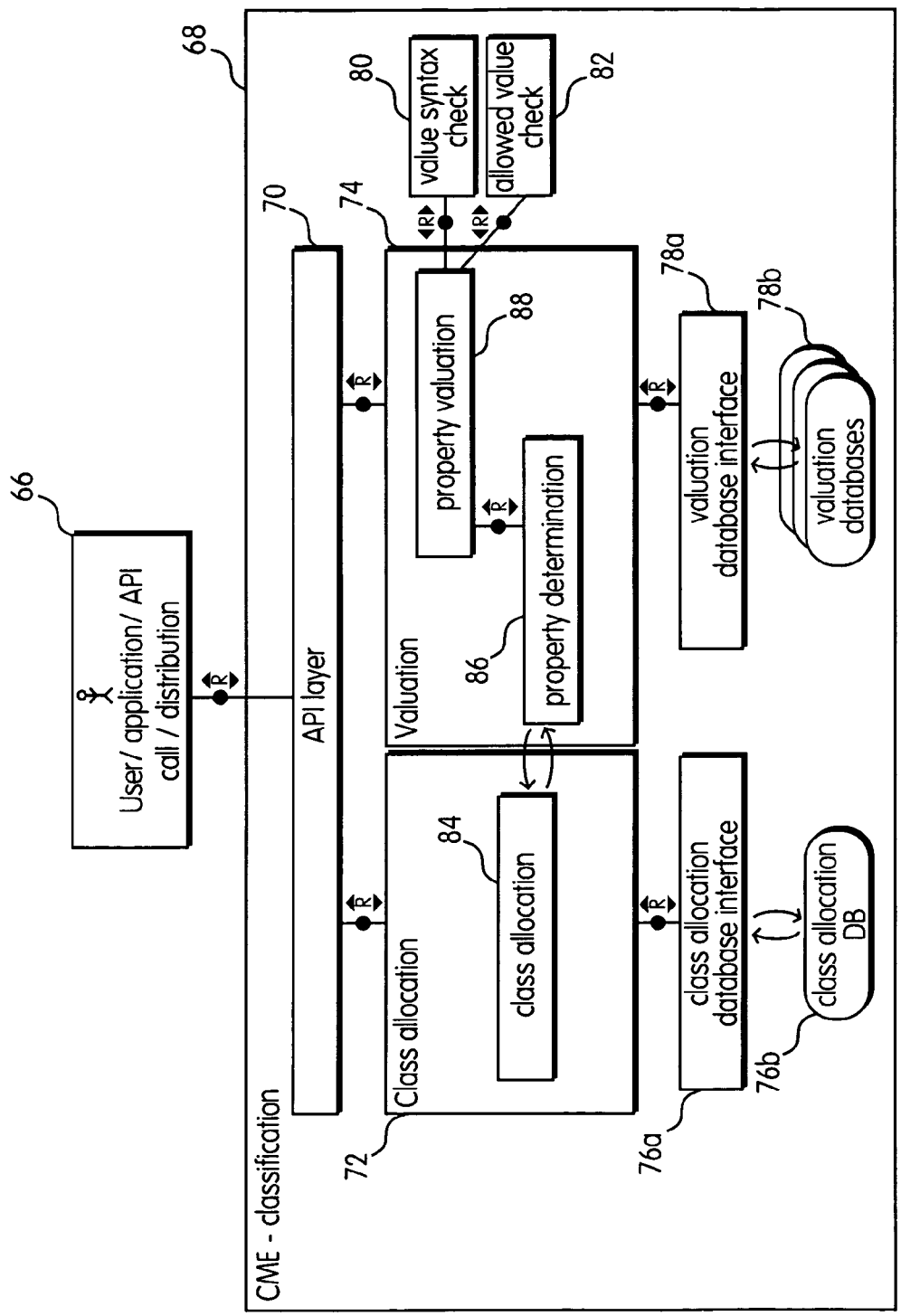
FIG. 8 is a block diagram of a classification management tool.

FIG. 8 shows a block diagram of a classification engine according to embodiments. A user, process, or application 66 can be connected to the classification engine 68 for classification. The classification engine 68 comprises an application programming interface 70, a class allocation engine 72, a property valuation engine 74, a class allocation database interface 76a, a class allocation database 76b, a property valuation database interface 78a, a property valuation database 78b, and value syntax check engine 80 as well as allowed value check engine 82.

For object classification, the application 66 requests classification engine 68 to provide a certain class for the object. The class allocation engine determines from class allocation database 76b through class allocation database interface 76a a respective class and allocates this class with the object within class allocation 84. During class allocation, properties belonging to the class may be determined from property determination 86.

After class allocation, properties of the object are valuated within property valuation engine 74. The property valuation engine 74 obtains from property valuation database 78b through property valuation database interface 78a available values for the respective properties. The values may depend on the respective property assigned to the object and provided within property determination 86 through property valuation 88.

After having assigned the properties to the object and valuated the properties accordingly within property valuation 88, the values of the properties are checked within value checking engine 82. In addition, the syntax of the values and the properties can be verified within the syntax checking engine 80.

After object classification and property valuation, the classification engine 68 can report to the process the completion of object classification.

What is claimed is:

1. A computer-implemented method for providing objects with object classification, the method comprising using a processor to perform the acts of:

receiving, at a classification engine, from one of a plurality of processes, a request to classify a data object representing a real world item, the request comprising a process value identifying the requesting process, the data object comprising a plurality of property definitions, each of the plurality of property definitions comprising at least one access right to the associated property definition for at least one of the plurality of processes;

determining which of the property definitions of the data object that the requesting process is allowed to access, the determining based on the process value received from the requesting process and the at least one access right of each of the property definitions;

selecting, from a plurality of classes available to the plurality of processes, a class comprising a set of class property definitions that most closely matches the determined property definitions of the data object;

allocating the selected class to the data object, the class allocation comprising an attribute indicating that only the requesting process is allowed to change the class allocation of the data object; and assigning the set of class property definitions to the data object in response to allocating the selected class to the data object.

2. The computer-implemented method of claim 1 wherein the property definitions comprise one or more property values, the method further comprising:

using the classification engine to set the one or more property values, independent of the plurality of processes, using predefined property values.

3. The computer-implemented method of claim 1, wherein the class allocation comprises an access right to the class allocation of the data object for at least one of the plurality of processes.

4. The computer-implemented method of claim 3, wherein each of the access rights comprise at least one of a read access right and a write access right.

5. The computer-implemented method of claim 1, further comprising:

receiving, from a calling process of the plurality of processes, a second request to retrieve the property definitions of the data object, the second request comprising a process value identifying the calling process;

and providing to the calling process, based on the process value identifying the calling process, those of the property definitions having an access right for the calling process.

6. The computer-implemented method of claim 1, further comprising searching for data objects using at least one of the property definitions and the class allocations of the data objects independent of the plurality of processes.

7. A non-transitory computer-readable medium having instructions which, when executed by a processor, cause the processor to:
- receive, at a classification engine, from one of a plurality of processes, a request to classify a data object representing a real world item, the request comprising a process value identifying the requesting process, the data object comprising a plurality of property definitions, each of the plurality of property definitions comprising at least one access right to the associated property definition for at least one of the plurality of processes;
- determine which of the property definitions of the data object that the requesting process is allowed to access, the determining based on the process value received from the requesting process and the at least one access right of each of the property definitions;
- select, from a plurality of classes available to the plurality of processes, a class comprising a set of class property definitions that most closely matches the determined property definitions of the data object;
- allocate the selected class to the data object, the class allocation comprising an attribute indicating that only the requesting process is allowed to change the class allocation of the data object; and
- assign the set of class property definitions to the data object in response to allocating the selected class to the data object.

8. The non-transitory computer-readable medium of claim 7, wherein the instructions further cause the processor to evaluate the property definitions of the object directly using property values defined for the property definitions, independently of the plurality of processes.

9. The non-transitory computer-readable medium of claim 7, wherein the class allocation comprises an access right to the classification of the data object for at least one of the plurality of processes.

10. The non-transitory computer-readable medium of claim 9, wherein each of the access rights comprises at least one of a read access right and a write access right.

11. The non-transitory computer-readable medium of claim 7, wherein the instructions further cause the processor to receive, from a calling process of the plurality of processes, a second request to retrieve the property definitions of the data object, the second request comprising a process value identifying the calling process, and to provide to the calling process, based on the process value identifying the calling process, those of the property definitions having an access right for the calling process.

12. The non-transitory computer-readable medium of claim 7, wherein the instructions further cause the processor to search for data objects using at least one of the property definitions and the class allocations of the data objects independently of the plurality of processes.

* * * * *